United States Patent [19]

Wismer et al.

[11] 4,132,822

[45] Jan. 2, 1979

[54] LAMINATES CONTAINING POLYESTER RESIN FINISHES

[75] Inventors: Marco Wismer, Gibsonia; Robert De Majistre, Natrona Heights, both of Pa.

[73] Assignee: PPG Industries, Inc., Pittsburgh, Pa.

[21] Appl. No.: 387,403

[22] Filed: Aug. 10, 1973

Related U.S. Application Data

[63] Continuation of Ser. No. 135,794, Apr. 20, 1971, abandoned.

[51] Int. Cl.² .................. B32B 33/00; B32B 27/36; B32B 31/20
[52] U.S. Cl. ........................ 428/196; 96/115 P; 156/230; 156/246; 156/272; 156/278; 156/323; 156/332; 428/431; 428/443; 428/481; 428/482
[58] Field of Search .............. 156/332, 308, 311, 344, 156/230, 278, 246, 323, 272, 327; 96/115 P; 260/2 R; 428/431, 482, 481, 443, 196

[56] References Cited

U.S. PATENT DOCUMENTS

| | | | |
|---|---|---|---|
| 2,631,960 | 3/1953 | Drafter, Jr. ...................... | 156/278 |
| 2,750,320 | 6/1956 | Latham ........................... | 156/323 X |
| 3,294,620 | 12/1966 | Petropoulos et al. ............. | 117/72 X |
| 3,551,241 | 12/1970 | Heeb et al. ...................... | 156/332 X |
| 3,623,943 | 11/1971 | Feldmeilen et al. ............. | 156/332 X |
| 3,637,382 | 1/1972 | Krauch ........................... | 96/115 P X |
| 3,639,504 | 2/1972 | Paleologo et al. ............... | 156/332 X |
| 3,644,161 | 2/1972 | Hall ................................. | 156/272 |
| 3,666,591 | 5/1972 | Hall ................................. | 156/332 X |
| 3,714,007 | 1/1973 | Borrel et al. ..................... | 156/272 X |

Primary Examiner—John T. Goolkasian
Assistant Examiner—Thomas Bokan
Attorney, Agent, or Firm—George D. Morris

[57] ABSTRACT

A decorative laminate is formed by placing an adhesive impregnated or coated decorative sheet on a core section, applying a polyester resin composition containing a peroxide catalyst and a photosensitizer to a release material and gelling the polyester resin composition by subjecting it to actinic light and placing the gelled polyester resin backed with release material on the impregnated or coated sheet supported by the core material and heat-pressing to form a composite structure. The release material is then removed from the cured polyester resin layer. Alternatively the polyester resin composition may be applied to the decorative sheet gelled with actinic light and then placed on the core sample, placing a release material on the gelled polyester resin composition and heat-pressing the composite. The resulting laminate is abrasion and stain resistant.

23 Claims, No Drawings

LAMINATES CONTAINING POLYESTER RESIN FINISHES

This is a continuation of application Ser. No. 135,794, filed Apr. 20, 1971, now abandoned.

This invention relates to a novel method of producing laminates to be used in the furniture industry and for other uses where a decorative composite article is desired. The composite articles, in order to be produced economically consist essentially of a bulk core material, such as wood core, or other core material which is inexpensive but generally rough and unsightly. The core material then is adhered to a decorative sheet which enhances the aesthetic value of the core. This is done by simply contacting an adhesive-impregnated or adhesive-coated sheet such as paper or cloth which is suitably decorated to the core material. The decorative sheet is then contacted with a strong, stain-resistant, protective film and the layers are heat-pressed to form a unitary composite structure which is relatively inexpensive but decorative and has a strong and smooth surface.

Polyester resins may be used as the protective layer for the decorative sheet and core section. However, when polyester resins are used the resulting protective layers are lacking in abrasion resistance and stain resistance and the polyester resins have been difficult to apply to the decorative sheet.

Thus, in the prior art of laminating decorative sheet to core materials and coating with polyester resins, the application of polyester resins to the surface of a core material or to a decorative sheet produced nibs in the cured resin so that in order to achieve a proper surface, the polyester resin had to be sanded which is an expensive process. Using the method of this invention, perfect features may be obtained on the laminate without sanding the polyester resin layer.

Further, the abrasion resistance of the prior art polyester protected core samples was poor requiring a coating of wax material over the polyester resin to improve the abrasion resistance. Using the method of this invention, excellent abrasion resistance can be obtained without adding a wax layer to the polyester resin.

It has now been discovered that a decorative composite may be produced using polyester resins as the protective layer and having excellent stain resistnce and abrasion resistance by a method comprising:

A — placing an adhesive-impregnated or coated decorative sheet on a core section;

B — applying a polyester resin composition comprising an unsaturated polyester, an ethylenically unsaturated monomer, a peroxide catalyst, and a photosensitizer to a release material and subjecting the polyester resin composition to actinic light to gel said composition without curing;

C — placing the gelled polyester resin composition backed with release material on the adhesive-impregnated or coated decorative sheet, which is in turn contacted with core material, said core material contacting the non-decorated side of the sheet;

D — applying sufficient heat and pressure to cure the polyester resin and bond the layers into a unitary composite structure; and E — removing the release material.

Alternatively the polyester resin composition may be coated on to the adhesive-impregnated or coated decorative sheet and gelled with actinic light and the decorative sheet placed on the core sample with a release material placed on the gelled polyester resin composition and heat-pressing to form the laminate and subsequently removing the release material.

The core material provides the bulk of the composite and, therefore, inexpensive core material such as particle board or lumber is preferred. Any conventional core material, however, such as plywood, fiberboard, gypsum board, or the like, may be used. The core material may vary in thickness, depending upon the dimensions of the finished article.

A layer of adhesive-impregnated or coated decorative sheet material is contacted to the core material. The sheet material need not be of any appreciable thickness as its sole purpose is to decorate the core section.

The decorative sheets are impregnated or coated with any conventional adhesive material to adhere the decorative sheet to the core section. The adhesive should, however, be a heat-crosslinkable polymer which will react with the unsaturated polyester resin to bond the polyester resin with the decorative sheet and the adhesive should have a melting point below about 200° F. Examples of these adhesive materials are diallyl phthalate prepolymer, unsaturated polyester, poly acrylic materials and other conventional adhesive materials.

The decorative sheet may be any substrate which may be decorated to produce an aesthetically pleasing effect. Examples of sheet materials which may be used are paper, glass cloth, asbestos cloth, felt, cotton, and linen cloths, rayon cloths, vinyl sheets, and the like. Such sheets may be decorated with designs and ornamentations before impregnating or coating with the adhesive.

To prepare the article for the protective layer of polyester resin, the adhesive-impregnated or coated decorative sheet is merely placed on the core section. The gelled unsaturated polyester resin which is backed with a release material is placed over the adhesive-impregnated or coated decorative sheet.

Prior to gelling, the polyester resin composition is coated on to a release material. The release material may be any material which may be removed from the polyester resin composition after the heat-press operation. Thus, the release material is used only to hold the polyester resin and to facilitate its use in the heat-press. Any common release material may be used such as aluminum foil, tin foil, tin plate, parchment paper, non-adherent paper, and the like.

The unsaturated polyester resin composition comprises an unsaturated polyester, an ethylenically unsaturated monomer, peroxide catalyst, and a photosensitizer.

The unsaturated polyesters are polyesters of an ethylenically unsaturated polycarboxylic acid and a polyhydric alcohol. The ethylenically unsaturated polycarboxylic acids include such acids as: maleic acid, fumaric acid, aconitic acid, mesaconic acid, citraconic acid, itaconic acid, and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mol percent to about 100 mol percent, and preferably in an amount of about 20 mol percent to about 80 mol percent, of the total mols of acid component in the polyester.

Saturated dicarboxylic acids may be utilized in combination with the unsaturated acid or anhydride in the preparation of unsaturated polyester resins. Such acids increase the length of the polyester without adding additional crosslinking sites, which is a desired feature in some polyesters. Examples of useful dicarboxylic acids which are either saturated or only aromatically unsaturated include:

succinic acid
adipic acid
suberic acid
azelaic acid
sebacic acid
phthalic acid
isophthalic acid
terephthalic acid
tetrachlorophthalic acid
hexachloroendomethylenetetrahydrophthalic acid and the like. As in the case of the ethylenically unsaturated acids, the anhydrides of these acids, where the anhydrides exist, are embraced in the term "acid." Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatic dicarboxylic acids. Such "saturated carboxylic acids" may also be referred to as "non-olefinically, unsaturated" polycarboxylic acids.

The polyhydric alcohols useful in preparing unsaturated polyester resins include:

ethylene glycol
diethylene glycol
triethylene glycol
polyethylene glycol
propylene glycol
dipropylene glycol
polypropylene glycol
glycerol
neopentyl glycol
pentaerythritol
trimethylol propane
trimethylol ethane and the like. The preferred polyols for the purpose of this invention have a molecular weight of less than about 2,000 and consist essentially of carbon, hydrogen and oxygen. The polyhydric alcohols are generally employed in an equal molar ratio to the total acid components, or as a slight excess, as, for example, about 5 mol percent excess.

Polymerizable ethylenically unsaturated compounds which crosslink with unsaturated polyesters to form thermosetting materials include such monomers as:

styrene
alpha-methyl styrene
divinyl benzene
vinyl acetate
allyl acetate
diallyl phthalate
diallyl succinate
diallyl adipate
diallyl sebacate
methyl acrylate
methyl methacrylate
hexyl acrylate
actyl acrylate
actyl methacrylate
diallyl itaconate
diallyl maleate
diallyl fumarate
triallyl cyanurate and the like. The preferred monomers are liquid compounds, soluble in the polyester components.

The monomer component or components may be employed over a broad range, but usually the proportion thereof, upon a weight basis, will be less than the polyester component. The amount of monomer is generally sufficient to provide a liquid, flowable, interpolymerizable mixture. Ordinarily, the percentage of monomer will fall within the range of about 10 percent to about 60 percent of the total weight of polyester and monomer. At the preferred range, the monomer is present in an amount of about 20 percent to about 50 percent.

Since the polyester component of the interpolymerizable mixture is often highly viscous or even solid at ambient temperature, it is preferred to add the monomer thereto at a temperature sufficient to render the polyester satisfactorily fluid for incorporation with the monomer. This temperature is usually in the range of about 100° C. to about 120° C., which is sufficiently high, in the absence of gelation inhibitors, to induce premature gelation upon introduction of the monomer into the system. This is true even in the absence of free-radical catalysts.

Accordingly, it is preferred to include a gelation inhibitor in one or both components of the mixture. Suitable inhibitors may be selected from the quinonic or phenolic class or from a group of quaternary ammonium salts and amine salts, especially amine halide salts. Suitable inhibitors of the quinonic or phenolic class include:

p-benzoquinone
chloranil
hydroquinone
3-isopropyl catechol
4-t-butyl catechol
3-methyl catechol
4-ethyl catechol
4-isopropyl catechol and the like.

The following are representative examples of halide salts of amines which may be employed as inhibitors:

trimethylamine hydrochloride
triethylamine hydrobromide
dimethylaniline hydrochloride
triethylamine hydrochloride
tri-n-butylamine hydrochloride
tribenzylamine hydrobromide
N-benzylaniline hydrochloride and the like. Useful quaternary ammonium salts include:

trimethyl benzyl ammonium acid oxalate trimethyl benzyl ammonium chloride
di(trimethyl benzyl ammonium) oxalate
trimethyl benzyl ammonium maleate
trimethyl benzyl ammonium tartrate and the like. Other useful ammonium compounds and amine halide compounds are disclosed in U.S. Pat. Nos. 2,593,787 and 2,646,416, respectively.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conveniently is in a range of about 0.001 percent to about 0.1 percent by weight, based upon the polyester component of the mixture.

The peroxide catalyst is a free radical initiator and any known free radical initiator may be used (see *Polyesters and Their Applications* by Bjorksten, Reinhold Publishing Corp. (1956), pages 48 to 51). The preferred catalyst is an organic peroxide, an organic hydroperoxide, or an ester thereof. Typical organic peroxides useful as catalysts for unsaturated polyester resins include:

benzoyl peroxide
acetyl peroxide
lauroyl peroxide
methyl ethyl ketone peroxide
cyclohexanone peroxide and the like.

Organic hydroperoxides or their esters with carboxylic acids useful as catalysts for unsaturated polyester resins include:

cumene hydroperoxide
tertiary butyl hydroperoxide
ditertiary butyl perphthalate
1-hydroxycyclohexyl hydroperoxide and the like. For the purposes of this invention, tertiary butyl perbenzoate and dicinyl peroxide are the preferred catalysts.

Many other useful catalysts are disclosed in the monograph *Organic Peroxides* by A. V. Tovolsky and R. B. Mesrobian, copyrighted in 1954 by Interscience Publishers, Inc., New York, pages 158–163.

These catalysts may be utilized in amounts of about 0.1 percent to about 5 percent by weight based upon the mixture of interpolymerizable materials.

The photosensitizers are those generally well known for activating actinic light-sensitivity such as benzoin methyl ether, benzoin, benzophenone, benzoin isopropylether, benzoin butyl ether, benzoin amyl ether, and the like. The photosensitizers are most effective when used in amounts of about 0.1 percent to about 2 percent by weight.

It is noted that the polyester resin composition may also contain various other ingredients to obtain desired properties such as fillers, dyes, and the like.

The polyester resin composition is coated on the release material and gelled by subjecting it to actinic light. The polyester resin layer is generally a thick layer of from about 3 mils thickness to about 25 mils thickness. Prior to this invention, the use of polyester films has been limited to thin layers due to the difficulties of curing films of higher thicknesses.

The polyester resin compositions are gelled when subjected to actinic light such as ultraviolet light. In general, the use of wave lengths in which sensitivity to actinic light occurs is approximately 1800 to 4000 angstrom units. Various suitable sources of the actinic light are available in the art including, by way of example, quartz mercury lamps, ultraviolet cored carbon arcs, and high-flash lamps.

The intensity of exposure to actinic light and amount of time of exposure of the polyester resin composition may be varied greatly. To achieve the desired properties, the polyester resin composition is exposed to the actinic light just long enough to gel the composition so that it is non-tacky and non-flowable but not long enough to completely cure the polyester resin composition. The intensity and exposure time varies with different polyester resin compositions. However, generally the polyester resin need only be exposed for a matter of seconds or less.

The release material coated with the gelled polyester resin composition is then placed on the decorative sheet so that the gelled polyester resin layer is contacting the adhesive-coated or impregnated decorative sheet. The entire composite of core section, impregnated sheet, polyester resin and release material is then subjected to a heat-press to form a unitary laminated structure and the release material is then removed from the composite.

The composite is inserted in a press at about 200° F. to about 400° F. at a pressure of from about 10 pounds per square inch to about 500 pounds per square inch or higher for a short period of time (approximately 2 to 15 minutes) to affect the heat-press operation. The release material is then removed from the polyester resin composite layer and a decorative article having excellent abrasion resistance and stain resistance is formed.

An article having decorative surfaces on both sides may be produced by merely repeating the above procedure and placing an adhesive-impregnated or coated decorative sheet on the untreated side of the core section, placing the gelled polyester resin composition backed with the release material on the decorative sheet and heat-pressing again and removing the release material.

A preferred method of treating both sides of the core material is by placing an adhesive-coated or impregnated decorative sheet on either side of the core section and placing gelled polyester resin compositions backed with release materials to both decorative sheets and heat-pressing in one step.

These decorative composite articles are very useful as furniture material, such as table tops, desk tops, cabinet components, chair trim, and the like, but may also be used for counter tops, wall coverings, floor coverings, and the like.

The following examples set forth specific embodiments of the instant invention. The invention, however, is not to be construed as being limited to these embodiments, for there are, of course, numerous possible variations and modifications. All parts and percentages in the examples, as well as throughout the specification, are by weight unless otherwise indicated.

EXAMPLE 1

A printed paper sheet impregnated with diallyl phthalate prepolymer was placed over a particle board core sample with the non-printed side contacting the core sample.

A polyester resin composition comprising an unsaturated polyester formed from 5 mols of maleic anhydride, 5 mols of phthalic anhydride, and 10 mols of propylene glycol was thinned to a 65:35 ratio with syrene monomer and 1 percent by weight of a solution of p-tertiary butyl perbenzoate, 0.1 percent by weight of methyl hydroquinone and 1 percent by weight of benzoin methyl ether were added and the composition was drawn down on an aluminum foil to a thickness of about 10 mils.

The polyester resin composition was subjected to ultraviolet light using a 1 ft.-high pressure mercury bulb (4,000 watts) for one pass at 100 feet per minute and a second pass at 25 feet per minute to gel the composition.

The gelled polyester resin composition backed with aluminum foil was then placed on top of the diallyl phthalate prepolymer impregnated sheet and the composite was heat-pressed in a mold at 295° F. and a pressure of 150 pounds per square inch for 5 minutes. The aluminum foil was then stripped off the composite and the resulting laminate had a hard clear surface.

The resulting laminate was tested for stain resistance and was found to be inert when contacted for 24 hours with a 5 percent solution of phenol, a 1 percent solution of iodine, a 10 percent solution of sodium hydroxide, merthiolate, acetone and ethyl acetate.

EXAMPLE 2

A printed grain paper sheet impregnated with diallyl phthalate prepolymer was coated with a polyester resin composition by the draw down method. The polyester composition comprised 92 percent by weight of a polyester formed from maleic anhydride, isophthalic acid and propylene glycol, 5.8 percent by weight of styrene monomer, 1 percent by weight of benzoin methyl ether, 1 percent by weight of t-butyl-perbenzoate and 0.2 percent of paraffin wax and the coating had a thickness of 6 mils. The polyester resin composition was gelled by subjecting to ultraviolet light using a 333 watts per inch bulb at 1.5 inch distance from the surface. The composition was passed through the UV unit 6 times at 100 feet per minute.

The decorative sheet was then placed on a particle board core sample and aluminum foil was placed over the gelled polyester resin layer. The composite was heat-pressed for 5 minutes at 295° F. and 150 p.s.i. and the aluminum foil was stripped off the composition.

The resulting laminate was tested for stain and chemical resistance by contacting for 24 hours with amyl acetate, acetone, navy blue dye, 1 percent iodine solution, 5 percent phenol solution, concentrated hydrochloric acid, 25 percent sodium hydroxide solution and mercurochrome. The laminate was resistant to all these materials.

It is pointed out that this process is operable with any polyester composition. Thus, the properties desired may be obtained by altering the components of the polyester.

We claim:

1. A method of preparing a decorative composite article comprising a core section, an intermediate decorative layer, and a polyester resin protective layer which comprises:
   A. placing an adhesive-impregnated or coated decorative sheet on a core section;
   B. applying a polyester resin composition comprising an unsaturated polyester of an ethylenically unsaturated polycarboxylic acid and a polyhydric alcohol, an ethylenically unsaturated monomer, a peroxide catalyst and a photosensitizer to a release material and subjecting the polyester resin composition to actinic light to gel said composition without completely curing;
   C. placing the gelled polyester resin composition backed with release material on the decorative sheet;
   D. applying sufficient heat and pressure to cure the polyester resin and bond the layers into a unitary composite structure and,
   E. removing the release material.
2. The method of claim 1 wherein the core section is particle board.
3. The method of claim 1 wherein the decorative sheet is paper.
4. The method of claim 1 wherein the decorative sheet is cloth.
5. The method of claim 1 wherein the unsaturated monomer is styrene.
6. The method of claim 1 wherein the photosensitizer is benzoin methyl ether.
7. The method of claim 1 wherein the polyester resin layer has a thickness of from about 3 to about 25 mils.
8. The method of claim 1 wherein the layers are bonded into a unitary composite structure by heat-pressing at a temperature from about 200° F. to about 400° F. and a pressure of from about 10 pounds per square inch to about 500 pounds per square inch or higher.
9. The method of claim 1 wherein the opposite side of the core section is further treated by:
   A. placing an adhesive-impregnated or coated decorative sheet on the opposite side of the core section;
   B. applying a polyester resin composition comprising an unsaturated polyester of an ethylenically unsaturated polycarboxylic acid and a polyhydric alcohol, an ethylenically unsaturated monomer, a peroxide catalyst and a photosensitizer to a release material and subjecting the polyester resin composition to actinic light to gel said composition without completely curing;
   C. placing the gelled polyester resin composition backed with release material on the impregnated or coated decorative sheet;
   D. applying heat and pressure to cure the polyester resin and bond the layers into a unitary composite article; and
   E. removing the release material.
10. The composite structure formed by the method of claim 1.
11. The composite structure formed by the method of claim 9.
12. A method of preparing a decorative composite article comprising a core section, an intermediate decorative layer, and a polyester resin protective layer which comprises:
   A. applying a polyester resin composition comprising an unsaturated polyester of an ethylenically unsaturated polycarboxylic acid and a polyhydric alcohol, an ethylenically unsaturated monomer, a peroxide catalyst and a photosensitizer to an adhesive-impregnated or coated decorative sheet and subjecting the polyester resin composition to actinic light to gel said composition without completely curing,
   B. placing the coated decorative sheet on a core section, C. placing a release material on the gelled polyester resin composition, and
D. applying sufficient heat and pressure to cure the polyester resin and bond the layers into a unitary composite structure, and
E. removing the release material.

13. The method of claim 12 wherein the layers are bonded into a unitary composite structure by heat-pressing at a temperature from about 200° F. to about 400° F. and a pressure of from about 10 pounds per square inch to about 500 pounds per square inch or higher.

14. The composite structure formed by the method of claim 12.

15. A method of preparing a decorative composite article comprising a core section, two intermediate decorative layers, one on each side of said core section and polyester resin protective layers on the sides of said intermediate decorative layers remote from said core section which comprises:
  A. placing an adhesive-impregnated or coated decorative sheet on one side of a core section and placing another adhesive-impregnated or coated decorative sheet on the opposite side of said core section;
  B. applying polyester resin composition comprising an unsaturated polyester of an ethylenically unsaturated polycarboxylic acid and a polyhydric alcohol, an ethylenically unsaturated monomer, a peroxide catalyst and a photosensitizer to two release materials and subjecting the polyester resin composition so applied to actinic light to gel said composition without completely curing;
  C. placing gelled polyester resin composition backed with release material on each of said decorative sheets;
  D. applying sufficient heat and pressure to cure the polyester resin and bond the layers into a unitary composite structure and;
  E. removing both release materials.

16. The method of claim 15 wherein the core section is particle board.

17. The method of claim 15 wherein the decorative sheet is paper.

18. The method of claim 15 wherein the decorative sheet is cloth.

19. The method of claim 15 wherein the ethylenically unsaturated monomer is styrene.

20. The method of claim 15 wherein the photosensitizer is benzoin methyl ether.

21. The method of claim 15 wherein the polyester resin layer has a thickness of from about 3 mils to about 25 mils.

22. The method of claim 15 wherein the layers are bonded into a unitary composite structure by heat-pressing at temperatures from about 200° F. to about 400° F. and at a pressure of from about 10 pounds per square inch to about 200 pounds per square inch.

23. The composite structure formed by the method of claim 15.

* * * * *